US012652211B2

(12) United States Patent
Zacks et al.

(10) Patent No.: US 12,652,211 B2
(45) Date of Patent: Jun. 9, 2026

(54) NETWORK FAILURE PREVENTION

(71) Applicant: Cisco Technology, Inc., San Jose, CA (US)

(72) Inventors: David John Zacks, Vancouver (CA); Thomas Szigeti, Vancouver (CA); Barry Qi Yuan, Vancouver (CA); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 18/208,659

(22) Filed: Jun. 12, 2023

(65) Prior Publication Data

US 2024/0414045 A1     Dec. 12, 2024

(51) Int. Cl.
| *H04L 41/0631* | (2022.01) |
| *H04L 41/0604* | (2022.01) |
| *H04L 41/16* | (2022.01) |

(52) U.S. Cl.
CPC ...... *H04L 41/0631* (2013.01); *H04L 41/0627* (2013.01); *H04L 41/16* (2013.01)

(58) Field of Classification Search
CPC . H04L 41/0631; H04L 41/0627; H04L 41/16; H04L 41/145; H04L 41/147; H04L 41/149; H04L 41/40; H04L 41/5025
See application file for complete search history.

(56) References Cited

U.S. PATENT DOCUMENTS

| | | | | | |
|---|---|---|---|---|---|
| 9,258,321 | B2 * | 2/2016 | Amsler | .............. | H04L 63/1425 |
| 11,113,144 | B1 * | 9/2021 | Gadepalli | ................ | G06N 3/08 |
| 11,573,881 | B1 * | 2/2023 | Massaguer | ........... | G06Q 10/101 |
| 12,034,587 | B1 * | 7/2024 | Zafer | ...................... | H04L 41/16 |
| 12,057,993 | B1 * | 8/2024 | Zafer | ................. | H04L 41/0654 |
| 12,095,628 | B2 * | 9/2024 | Lukens | ................ | H04L 41/147 |
| 2012/0041575 | A1 * | 2/2012 | Maeda | ................. | G05B 23/024 |
| | | | | | 700/79 |
| 2014/0201836 | A1 * | 7/2014 | Amsler | ................... | H04L 63/20 |
| | | | | | 726/23 |
| 2016/0308734 | A1 * | 10/2016 | Feller | .................. | H04L 41/5009 |
| 2017/0011298 | A1 * | 1/2017 | Pal | ........................... | G06N 5/04 |
| 2018/0123836 | A1 * | 5/2018 | Henry | ..................... | H04B 5/28 |
| 2018/0352025 | A1 * | 12/2018 | Anya | ..................... | H04L 43/08 |
| 2019/0102717 | A1 * | 4/2019 | Wu | ...................... | H04L 41/147 |
| 2019/0116485 | A1 * | 4/2019 | Vasseur | ................ | H04W 28/04 |
| 2019/0207822 | A1 * | 7/2019 | Di Pietro | ............... | H04L 41/16 |
| 2019/0228266 | A1 * | 7/2019 | Habibian | .............. | G06N 3/044 |
| 2019/0281476 | A1 * | 9/2019 | Lyon | ..................... | H04W 24/04 |
| 2019/0306023 | A1 * | 10/2019 | Vasseur | .................. | H04L 43/50 |

(Continued)

*Primary Examiner* — Jimmy H Tran
(74) *Attorney, Agent, or Firm* — Lee & Hayes, P.C.

(57) ABSTRACT

Techniques for mitigating network failures (e.g., SLA violations, service degradations, network outages, etc.) based on output(s) from a predictive network system. The techniques may include determining that a failure is predicted to occur in a network and determining a correlation between the failure and a previous failure that occurred in the network. In examples, the correlation may be determined using a machine-learned model. The techniques may also include determining, based at least in part on the correlation, a condition contributing to the failure. In this way, prior to occurrence of the failure, a parameter associated with the network may be altered based at least in part on the condition to mitigate or otherwise prevent the failure.

20 Claims, 5 Drawing Sheets

(56)          References Cited

U.S. PATENT DOCUMENTS

| | | | |
|---|---|---|---|
| 2020/0022016 A1* | 1/2020 | Fenoglio | G06N 3/042 |
| 2020/0097352 A1* | 3/2020 | Mahindru | G06F 11/079 |
| 2020/0112489 A1* | 4/2020 | Scherger | H04L 41/12 |
| 2020/0159601 A1* | 5/2020 | Asmussen | G06N 5/01 |
| 2020/0259700 A1* | 8/2020 | Bhalla | G06F 3/0482 |
| 2020/0265331 A1* | 8/2020 | Tashman | G06N 20/20 |
| 2020/0313979 A1* | 10/2020 | Kumaran | H04L 12/4641 |
| 2020/0351173 A1* | 11/2020 | Vasseur | H04L 41/40 |
| 2020/0389371 A1* | 12/2020 | Tedaldi | H04L 41/147 |
| 2021/0336871 A1* | 10/2021 | Vasseur | H04L 47/805 |
| 2021/0344601 A1* | 11/2021 | Ye | H04L 47/33 |
| 2022/0029922 A1* | 1/2022 | Mereddy | H04L 41/12 |
| 2022/0036199 A1* | 2/2022 | Prasanna | G06N 3/006 |
| 2022/0038347 A1* | 2/2022 | Vasseur | G06F 18/2185 |
| 2022/0172037 A1* | 6/2022 | Kang | G06N 3/044 |
| 2022/0239562 A1* | 7/2022 | Raymond | H04L 41/12 |
| 2023/0018199 A1* | 1/2023 | Mahamuni | G06F 11/3051 |
| 2023/0155675 A1* | 5/2023 | Tanaka | H04B 10/07957 398/16 |
| 2023/0230111 A1* | 7/2023 | Nagalla | G06N 3/08 705/7.31 |
| 2023/0342174 A1* | 10/2023 | Yang | G06F 3/067 |
| 2023/0396512 A1* | 12/2023 | Malleshaiah | H04Q 9/00 |
| 2024/0007504 A1* | 1/2024 | Triplet | H04L 41/0869 |
| 2024/0022923 A1* | 1/2024 | Arora | H04W 24/02 |

* cited by examiner

300

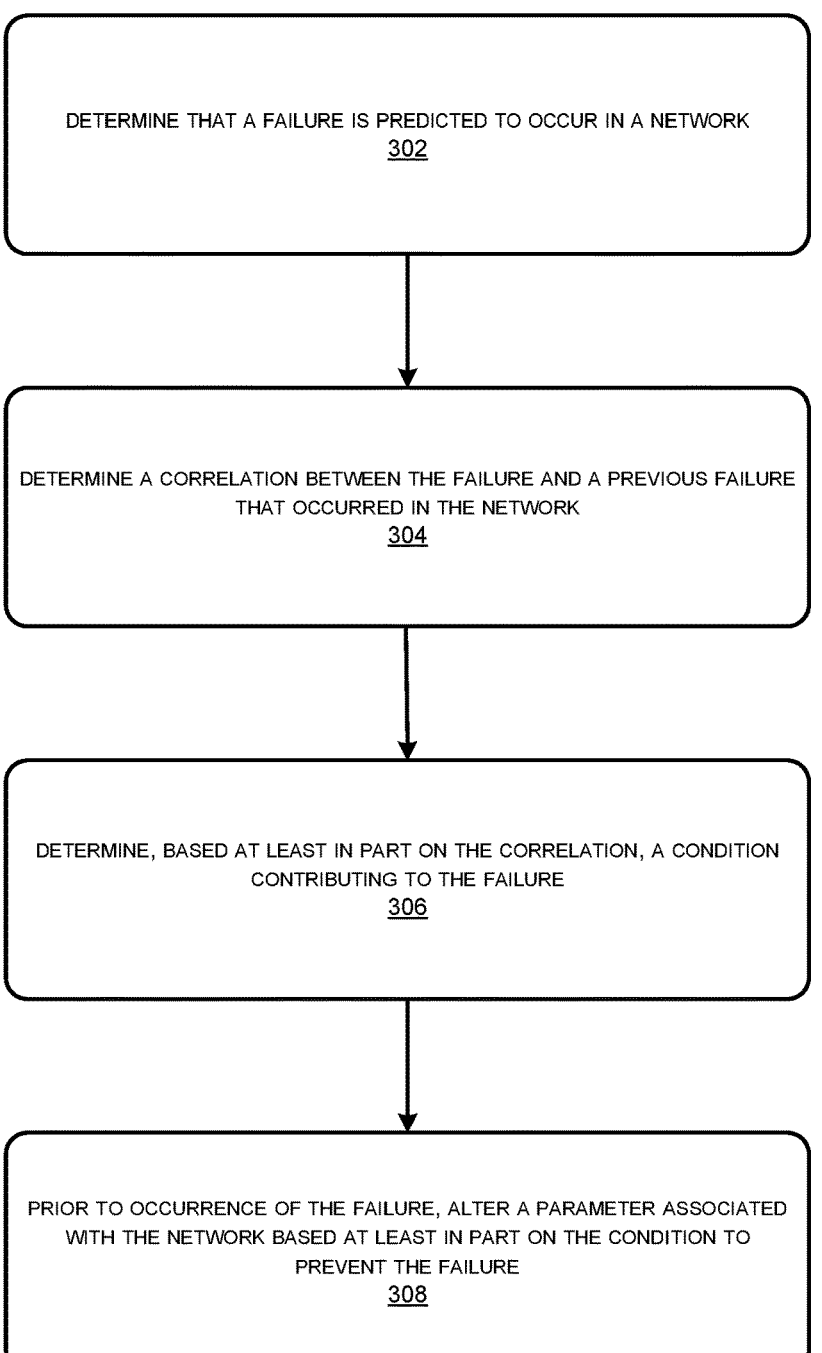

DETERMINE THAT A FAILURE IS PREDICTED TO OCCUR IN A NETWORK
302

DETERMINE A CORRELATION BETWEEN THE FAILURE AND A PREVIOUS FAILURE
THAT OCCURRED IN THE NETWORK
304

DETERMINE, BASED AT LEAST IN PART ON THE CORRELATION, A CONDITION
CONTRIBUTING TO THE FAILURE
306

PRIOR TO OCCURRENCE OF THE FAILURE, ALTER A PARAMETER ASSOCIATED
WITH THE NETWORK BASED AT LEAST IN PART ON THE CONDITION TO
PREVENT THE FAILURE
308

FIG. 3

NETWORK FAILURE PREVENTION

TECHNICAL FIELD

The present disclosure relates generally to techniques for, among other things, mitigating network service degradations (e.g., service-level agreement (SLA) violations, network outages, network failures) based on output(s) from a predictive network system.

BACKGROUND

Modern predictive network systems use artificial intelligence (AI) techniques to predict SLA violations and other network outages. However, these predictive network systems do not prevent outages. This is because addressing SLA violations and other network outages—and further preventing them from re-occurring—requires detailed forensic analysis of the problem. However, the challenge today is that all of this occurs after the issue has happened.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 is a flow diagram illustrating an example method associated with the techniques described herein.

DESCRIPTION OF EXAMPLE EMBODIMENTS

Overview

Figure 1:
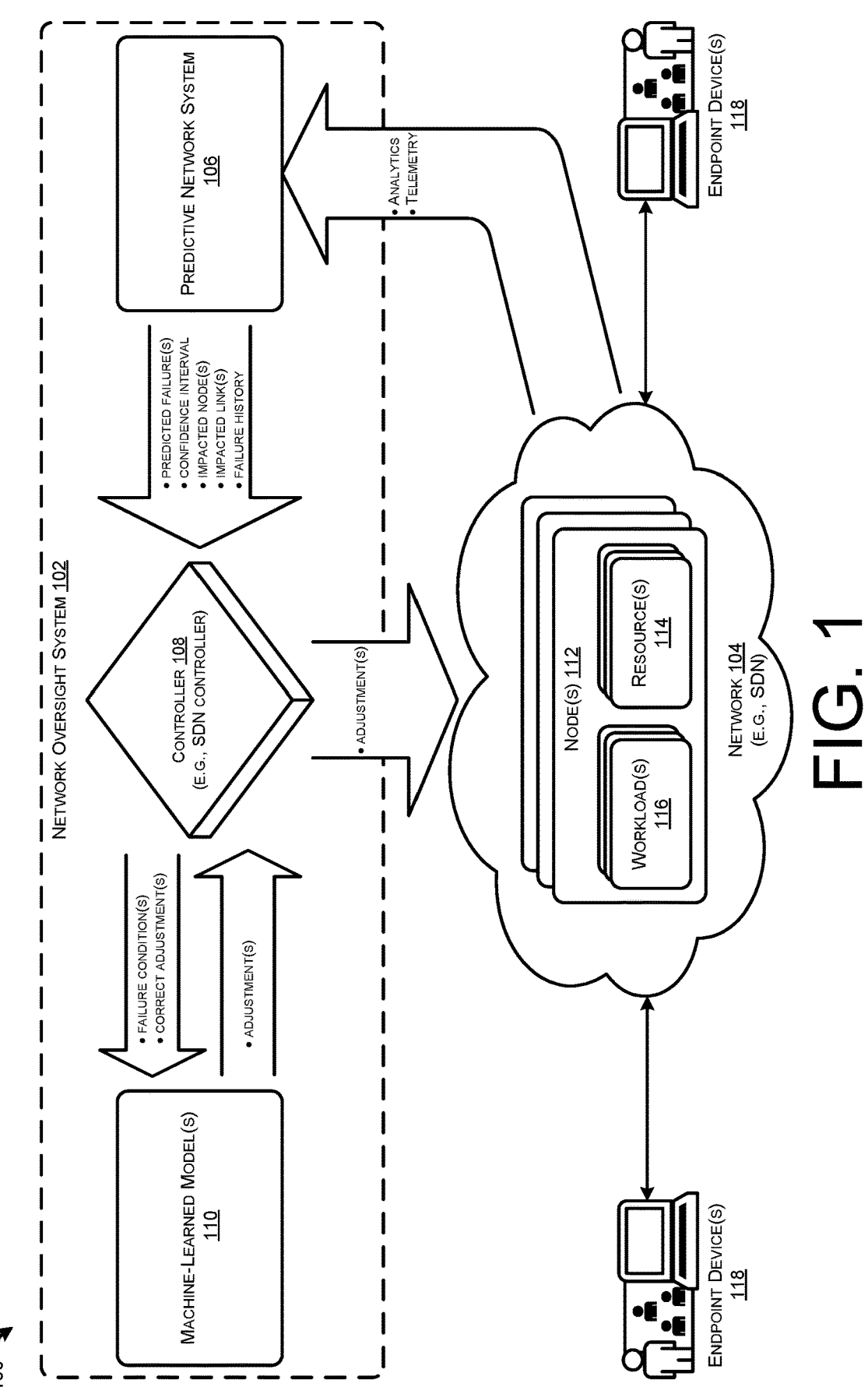
FIG. 1 illustrates an example architecture which may perform various aspects of the technologies disclosed herein.

This disclosure describes various technologies for, among other things, mitigating network service degradations (e.g., service-level agreement (SLA) violations and other network outages) based on output(s) from a predictive network system. By way of example, and not limitation, a method according to the techniques described herein may include determining that a failure is predicted to occur in a network and determining a correlation between the failure and a previous failure that occurred in the network. In examples, the correlation may be determined using a machine-learned model. The techniques may also include determining, based at least in part on the correlation, a condition contributing to the failure. In this way, prior to occurrence of the failure, a parameter associated with the network may be altered based at least in part on the condition to mitigate or otherwise prevent the failure.

Additionally, the techniques described herein may be performed as a method and/or by a system having non-transitory computer-readable media storing computer-executable instructions that, when executed by one or more processors, performs the techniques described above and herein.

Example Embodiments

As noted above, addressing SLA violations and other network service degradations—and further, preventing them from re-occurring—requires detailed forensic analysis of the problem. However, the challenge today is that all of this occurs after the issue has already happened.

This application is directed to techniques for utilizing predicted network failure(s) (e.g., SLA violation(s), network outage(s), or other service degradations) determined by a predictive network system to program a network controller (e.g., software-defined network (SDN) controller) to make strategic changes to the network so the network failure(s) can be mitigated and/or avoided in the future. For instance, the network controller may leverage alerts from the predictive network system indicating which network failure(s) might occur, including elements such as confidence intervals, impacted nodes or links, SLA violations, an analysis of a history of past failures (if any), and then, based on a predicted network failure, the network controller may proactively take action. In examples, this may occur with knowledge of the underlying network topology, as well as which applications are involved, and would allow the network controller to proactively determine the most probable underlying cause of the predicted network failure(s) within the impacted node(s) or links and take actions to prevent the predicted network failure(s) from occurring in the first place, thereby improving network and system uptime and preserving user and application productivity.

In some examples, the steps of determining the most probable underlying cause of the predicted network failure(s) within the targeted node(s) may involve root-cause analysis of the network failure(s) to determine a set of adjustments which could be made to correct future failures. Additionally, or alternatively, machine-learning techniques (e.g., reinforcement learning) may be utilized to teach the network controller how the network failure(s) can be improved by taking specific and proactive action.

In some examples, the network controller may determine one or more changes that can be made to the network and/or resources to prevent the violation from occurring in the future. For instance, the network controller may determine the change(s) based at least in part on historical patterns, determining when a future outage might occur, determining how a future outage might occur, and/or the like. During early phases of using the technologies disclosed herein, it may be unknown which change(s) will most-positively improve network conditions during the failure(s). However, over time, the network controller and/or machine-learned model(s) utilized by the controller may learn which change(s) will most-positively improve the network conditions presented.

In some examples, prior to a predicted failure, the network controller may adjust or otherwise alter one or more network parameters, system parameters, and/or allocations in an attempt to avoid the predicted failure using the machine-learning techniques. While this involves some amount of trial and error on the part of the machine-learning algorithm, the algorithm may quickly examine changes to network behavior based on the changes made by the network controller in an attempt to correct the problem. For example, the network controller may adjust a set of possible levers to solve a specific network problem. Examples of these problems and adjustments may include, but not be limited to: (i) Problem: projected network bandwidth exhaustion. Adjustment: tweak network pathing (e.g., route costing), tunnel selection, and/or buffer allocations to avoid or minimize the SLA impact of the projected issue: (ii) Problem: projected CPU exhaustion. Adjustment: move workloads or adjust vCPU allocations: (iii) Problem: projected memory exhaustion. Adjustment: adjust virtual memory allocations or shift workloads between nodes: (iv) Problem: latency issues. Adjustment: QoS buffer changes on ingress or egress interfaces.

In some examples, Reinforcement Learning may be used to repair predicted network outages, where the network controller may examine the results of the changes it has made to the network and determine an outcome of the changes. While the Reinforcement Learning algorithm will likely make mistakes early on, as the algorithm learns and trains the Reinforcement Learning policy gradient, positive changes to the network become much more prescriptive.

For example, as network failures occur, the Reinforcement Learning model may be trained each time according to the conditions of the issue and what adjustments were made to correct for it. This may have the effect of shaping the configuration to a better state to prevent future violations from occurring. Eventually, as more successful changes are made according to the observed environmental conditions, the network configuration may be optimized such that violations either do not occur or they are lessened as much as possible. That is, the Reinforcement Learning policy gradient may be shaped in such a way that the network controller learns how to avoid network failure(s) in the future not only for this occurrence, but for similar ones in other places (e.g., other parts of the network, other networks, etc.). In some examples, when a network failure is projected to be over, changes may be reversed by the network controller and the system may continue to be monitored through the predictive system should the parameter(s) need to be adjusted again.

In some examples, the techniques disclosed herein leverage the seasonal predictability of SLA violations and network outages learned by a predictive network system (e.g., Predictive Internet) to solve future violations/outages using machine-learning techniques, such as deep reinforcement learning. In examples, for a given network failure outage, the network controller may be provided with a set of configuration environment variables which may be adjusted by the network controller using the machine-learning techniques. In some examples, these variables may be outage domain specific and may have thresholds to ensure performance does not get substantially worsen. In some examples, for a given problem the controller may apply the machine-learning mechanism by exploring the environment and monitoring how any configuration change affects performance (e.g., the SLA violation). Additionally, the controller may observe how network performance changes when a variable is changed. In this way, as changes are made, improvements or degradations to network performance and/ or application performance may train the machine-learning policy gradient so the controller learns how to best fix a given network failure.

According to the techniques described herein, several advantages in computer-related technologies may be realized. For instance, the techniques disclosed herein intelligently and proactively enable automated and dynamic response for one or more node(s) involved in a predicted network failure using machine-learning techniques. Enabling such actions only after network failures occur is not enough as it will, out of necessity in such a case, always miss the initial impact of the network failure, and this is often where the most severe application-oriented impacts occur. Rather, these techniques leverage outputs form a predictive network system combined with a network controller that uses machine learning (e.g., reinforcement learning) to avoid future network failures (e.g., SLA violations) and similar failures/violations in other places. The disclosed techniques resolve network outages and assist in maintaining availability and performance across applications, networks, and end-to-end systems for organizations involved.

By way of example, and not limitation, a method according to the technologies disclosed herein may include determining that a failure (e.g., SLA violation) is predicted to occur in a network. For instance, a network controller (e.g., SDN controller) of the network may receive an indication that the failure is predicted to occur in the network at a future point in time. In some examples, the indication may be an alert received from a predictive network system that predicted the failure. The alert may indicate one or more failure(s) predicted to occur in the network at future points in time. In some examples, the predictive network system may include, in the indication, elements such as confidence intervals, impacted nodes or links, SLA violations, an analysis of a history of past failures (if any), and/or the like.

In some examples, the method may also include determining a correlation between the failure and a previous failure (e.g., previous SLA violation, previous service degradation, etc.) that occurred in the network or in another network. In some instances, the correlation may be determined at least partially using a machine-learned model (e.g., a reinforcement-learning model). In some examples, the machine-learned model may be trained based at least in part on previous conditions contributing to failures in the network, previous alterations made to parameters of the network to prevent/mitigate previous failures, results of network performance responsive to those previous alterations, and the like.

In some examples, the method may include determining a condition contributing to the failure. For instance, the network controller may determine the condition contributing to the failure based at least in part on the correlation. Additionally, in some examples, the determination of the condition may further be based at least in part on a topology of the network, an application involved in the failure, and/or the like. For examples, based on one or more of the correlation, the underlying network topology, and/or which applications are involved, the network controller may proactively determine the condition that is the most probable underlying cause of the predicted network failure(s) within the targeted node(s). In some examples, the network controller may perform root-cause analysis of previous network failures to determine the condition contributing to the predicted/future failure. In some examples, the condition may include network bandwidth exhaustion, CPU exhaustion, memory exhaustion, latency issues, etc.

In some examples, prior to occurrence of the failure, a parameter associated with the network may be altered based at least in part on the condition to prevent the failure. In some examples, the controller may alter the parameter associated with the network to prevent/mitigate the failure. That is, the network controller may alter the parameter prior to the failure occurring. In some examples, the specific parameter(s) that is/are altered may depend on the underlying condition contributing to the failure. For example, if the condition is network bandwidth exhaustion, then at least one of network pathing, tunnel selection, or buffer allocations may be altered by the network controller. As another example, if the condition is CPU exhaustion, then the network controller may move workload(s) or adjust vCPU allocations. As yet another example, if the condition is memory exhaustion, then altering the parameter may include adjusting virtual memory allocations and/or moving a workload from a first node to a second node. As an even further example, if the condition is a latency issue, then the network controller may alter a quality of service (QOS) buffer on an ingress interface or an egress interface.

In some examples, after the parameter has been altered, the controller and the predictive network system may continue to monitor the network. For instance, based on the resulting behavior of the network in responsive to the changes, the machine-learned model may be further trained/refined. That is, as network failures occur, the machine-learned model may be trained each time according to the conditions of the issue and what adjustments were made to correct for it. This may have the effect of shaping the machine-learned model's configuration to a better state to prevent future violations from occurring. Eventually, as more successful changes are made according to the observed environmental conditions, the network configuration may be optimized such that violations either do not occur or they are lessened as much as possible. That is, the machine-learned model may be trained in such a way that the network controller learns how to avoid network failure(s) in the future not only for this occurrence, but for similar failures as well. In some examples, if it is determined that the condition contributing the failure has ceased, then the network controller may revert the parameter(s) to their previous state. Additionally, the network controller may continue to monitor the network to determine whether the parameter or other parameters should be changed again.

Certain implementations and additional embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 which may perform various aspects of the technologies disclosed herein. The architecture 100 may include a network oversight system 102, which oversees and controls operations taking place in the network 104, which may be a software-defined network (SDN). The network 104 may include one or more node(s) 112, which may include one or more resource(s) 114 for running one or more workload(s) 116. In examples, the network 104, or any of the node(s) 112, resource(s) 114, or workload(s) 116 therein may be utilized by one or more endpoint device(s) 118, such as for point-to-point connectivity, for hosting applications, etc.

In examples, the network oversight system 102 includes a predictive network system 106, a controller 108, and one or more machine-learned model(s) 110. In various examples, the predictive network system 106 may include functionality to gather telemetry data, analytics, and other information from a variety of telemetry sources and learn network patterns using a variety of models to predict user experience issues and provide problem solving options. Among other things, the predictive network system 106 includes functionality to predict failures in the network 104, such as SLA violations and other network outages. As such, the predictive network system 106 may send alerts to the controller 108 associated with predicted failure(s) detected in the network 104. For instance, the predictive network system 106 may provide, to the controller 108, predicted failure alerts, confidence intervals, impacted node(s), impacted link(s), failure history, etc.

In examples, the controller 108 may utilize the machine-learned model(s) 110 to proactively make adjustment(s) to the network 104 in anticipation of predicted failures. For instance, the controller 108 may input network conditions and/or failure condition(s) into the machine-learned model(s) 110 and receive suggested adjustment(s) to be made to the network 104. In examples, the machine-learned model(s) 110 may be continuously trained over time to make correct adjustment(s) to the network 104 to mitigate or avoid failures. For instance, when adjustments are made by the machine-learned model(s) 110, the controller 108 may provide feedback associated with the correct adjustment(s) to the machine-learned model(s) 110. In this way, when similar failure condition(s) are detected by the machine-learned model(s) 110, similar adjustment(s) may be proposed.

Figure 2:
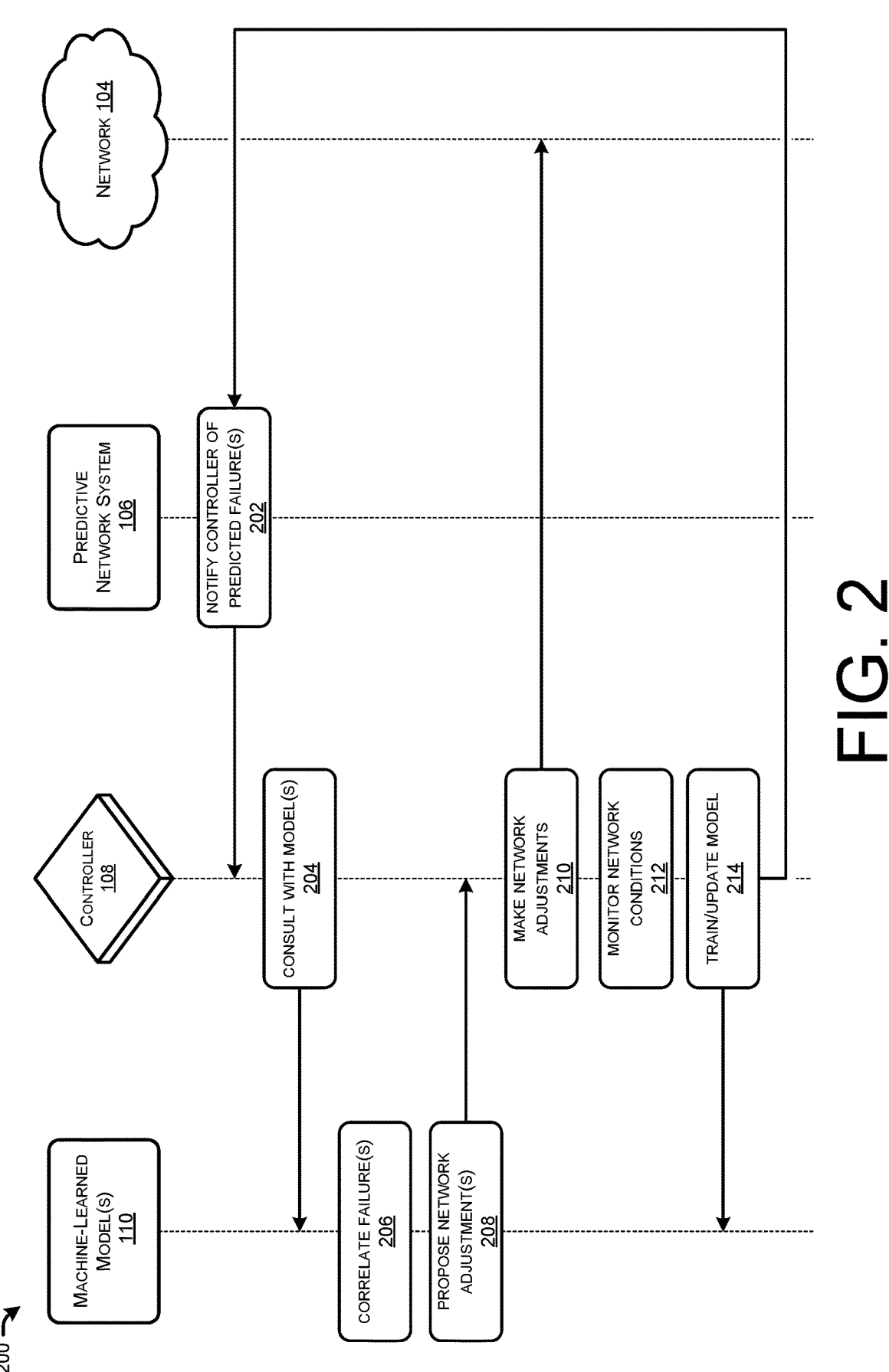
FIG. 2 is a pictorial flow diagram illustrating an example system flow associated with the techniques described herein.

FIG. 2 is a pictorial flow diagram illustrating an example system flow 200 associated with the techniques described herein. In examples, various aspects and operations of the system flow 200 may be performed, at least in part, by entities of the architecture 100, such as the machine-learned model(s) 110, the controller 108, and the predictive network system 106 to mitigate failures in the network 104. Additionally, while the controller 108 and the machine-learned model(s) 110 are shown as separate components, it is to be understood that the machine-learned model(s) 110 may be part of the controller 108. That is, the operations shown as being performed by the machine-learned model(s) 110 could be performed by the controller 108 itself utilizing a machine-learning algorithm or reinforcement learning.

At operation 202, the system flow 200 includes the predictive network system 106 notifying the controller 108 of predicted failure(s) in the network 104. For instance, the predictive network system 106 may monitor the network over a period of time and learn about seasonal failure(s) and other SLA violations. In some examples, the predictive network system 106 may include, in the notification, elements such as confidence intervals, impacted nodes or links, SLA violations, an analysis of a history of past failures (if any), and/or the like.

At operation 204, the system flow 200 includes the controller 108 consulting with the machine-learned model(s) 110. For instance, the controller 108 may input information related to the network 104 and/or the failure(s) into the machine-learned model(s) 110, such as the confidence intervals, the impacted nodes or links, SLA violations, the history of past failures, etc. In some examples, the machine-learned model(s) 110 may be trained based at least in part on previous conditions contributing to failures in the network, previous alterations made to parameters of the network to prevent/mitigate previous failures, results of network performance responsive to those previous alterations, and the like.

At operation 206, the system flow 200 includes the machine-learned model(s) 110 correlating the failure(s) with past network failures or adverse conditions. That is, in some examples, the machine-learned model(s) 110 may correlate the current network conditions giving rise to the predicted failures with past conditions that gave rise to the same or similar failures. In this way, the machine-learned model(s)

110 may determine a most-likely cause of the failure or cause of the condition giving rise to the failure. Additionally, in some examples, the correlation and/or determination of the condition may further be based at least in part on a topology of the network 104, an application involved in the failure, and/or the like.

At operation 208, the system flow 200 includes the machine-learned model(s) 110 proposing network adjustment(s) to the controller 108. For example, if the condition is network bandwidth exhaustion, then the machine-learned model(s) 110 may propose altering at least one of network pathing, tunnel selection, or buffer allocations. As another example, if the condition is CPU exhaustion, then the machine-learned model(s) 110 may propose moving workload(s) or adjusting vCPU allocations. As yet another example, if the condition is memory exhaustion, then the machine-learned model(s) 110 may propose adjusting virtual memory allocations and/or moving a workload from a first node to a second node. As an even further example, if the condition is a latency issue, then the machine-learned model(s) 110 may propose altering a quality of service (QOS) buffer on an ingress interface or an egress interface.

At operation 210, the system flow 200 includes the controller 108 making one or more adjustment(s) to the network 104. For instance, the controller 108 may alter one or more parameters of the network 104 in accordance with the adjustment(s) proposed by the machine-learned model(s) 110. In some examples, these network adjustments may be made by the controller 108 just prior to occurrence of the predicted failure.

At operation 212, the system flow 200 may include the controller 108 (and/or the predictive network system 106) monitoring conditions in the network 104. For instance, based on the resulting behavior of the network 104 in response to the adjustment(s), the predicted failure may be mitigated, avoided, unchanged, worsened, etc., and this behavior may be monitored. Accordingly, at operation 214, the controller 108 may train/update the machine-learned model(s) 110. For instance, the machine-learned model(s) 110 may be further trained/refined based on the network performance following the network adjustments proposed by the model(s) 110. In this way, as network failures occur, the machine-learned model(s) 110 may be trained each time according to the conditions of the issue and what adjustments were made to correct for it. This may have the effect of shaping the machine-learned model(s) 110 configuration to a better state to prevent future failures and SLA violations from occurring. Eventually, as more successful changes are made according to the observed network 104 conditions, the network 104 configuration may be optimized such that violations either do not occur or they are lessened as much as possible. That is, the machine-learned model(s) 110 may be trained in such a way that the network controller 108 learns how to avoid network failure(s) in the future not only for a specific occurrence, but for similar failures as well.

FIG. 3 is a flow diagram illustrating an example method associated with the techniques described herein. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules.

These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 300 begins at operation 302, which includes determining that a failure (e.g., SLA violation) is predicted to occur in a network. For instance, the controller 108 (e.g., SDN controller) of the network 104 may receive an indication that the failure is predicted to occur in the network 104 at a future point in time. In some examples, the indication may be an alert received from the predictive network system 106 that predicted the failure. The alert may indicate one or more failure(s) predicted to occur in the network 104 at future points in time. In some examples, the predictive network system 106 may include, in the indication, elements such as confidence intervals, impacted nodes or links, SLA violations, an analysis of a history of past failures (if any), and/or the like.

At operation 304, the method 300 includes determining a correlation between the failure and a previous failure that occurred in the network. For instance, the controller 108 may utilize the machine-learned model(s) 110 or other machine-learning techniques to determine the correlation between the failure and the previous failure. In some examples, the machine-learned model may be trained based at least in part on previous conditions contributing to failures in the network, previous alterations made to parameters of the network to prevent/mitigate previous failures, results of network performance responsive to those previous alterations, and the like.

At operation 306, the method 300 includes determining, based at least in part on the correlation, a condition contributing to the failure. For instance, the controller 108 may utilize the machine-learned model(s) 110 or other machine-learning techniques to determine the condition contributing to the failure. Additionally, in some examples, the determination of the condition may further be based at least in part on a topology of the network, an application involved in the failure, and/or the like. In some examples, based on one or more of the correlation, the underlying network topology, and/or which applications are involved, the network controller may proactively determine the condition that is the most probable underlying cause of the predicted network failure(s) within the targeted node(s). In some examples, the network controller may perform root-cause analysis of previous network failures to determine the condition contributing to the predicted/future failure. In some examples, the condition may include network bandwidth exhaustion, CPU exhaustion, memory exhaustion, latency issues, etc.

At operation 308, the method 300 includes prior to occurrence of the failure, altering a parameter associated with the network based at least in part on the condition to prevent the failure. For instance, the controller 108 may alter the parameter associated with the network 104 to prevent the failure. In some examples, the specific parameter that is altered may depend on the underlying condition contributing to the failure. For example, if the condition is network bandwidth exhaustion, then at least one of network pathing, tunnel selection, or buffer allocations may be altered by the network controller. As another example, if the condition is CPU exhaustion, then the network controller may move workload(s) or adjust vCPU allocations. As yet another example, if the condition is memory exhaustion, then altering the parameter may include adjusting virtual memory allocations and/or moving a workload from a first node to a second node. As an even further example, if the condition is a latency issue then the network controller may alter a quality of service (QOS) buffer on an ingress interface or an egress interface.

In some examples, after the network parameter has been altered, the controller and the predictive network system may continue to monitor the network. For instance, based on the resulting behavior of the network in response to the changes, the machine-learned model may be further trained/refined. That is, as network failures occur, the machine-learned model may be trained each time according to the conditions of the issue and what adjustments were made to correct for it. This may have the effect of shaping the machine-learned model's configuration to a better state to prevent future violations from occurring. Eventually, as more successful changes are made according to the observed environmental conditions, the network configuration may be optimized such that violations either do not occur or they are lessened as much as possible. That is, the machine-learned model may be trained in such a way that the network controller learns how to avoid network failure(s) in the future not only for this occurrence, but for similar failures as well.

Figure 4:
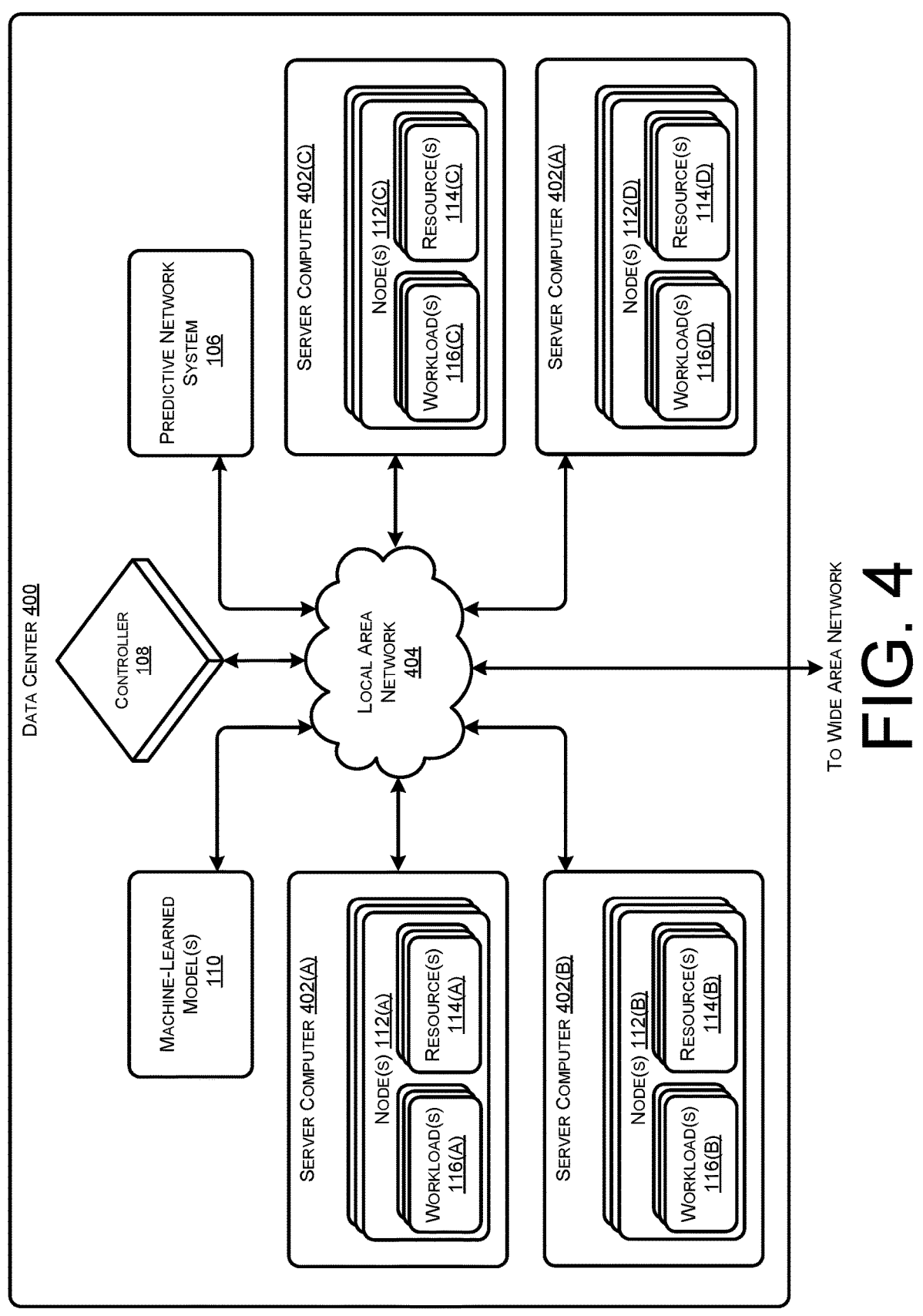
FIG. 4 is a computing system diagram illustrating an example configuration of a data center that can be utilized to implement aspects of the technologies disclosed herein.

FIG. 4 is a computing system diagram illustrating an example configuration of a data center 400 that can be utilized to implement aspects of the technologies disclosed herein. The example data center 400 shown in FIG. 4 includes several server computers 402(A)-402(D) (which might be referred to herein singularly as "a server computer 402" or in the plural as "the server computers 402") for providing computing resources. In some examples, the resources and/or server computers 402 may include, or correspond to, the any type of networked device described herein. Although described as servers, the server computers 402 may comprise any type of networked device, such as servers, switches, routers, hubs, bridges, gateways, modems, repeaters, access points, proxies, etc.

The server computers 402 can be standard tower, rack-mount, or blade server computers configured appropriately for providing computing resources. In some examples, the server computers 402 may host one or more nodes 112(A)-112(D). The nodes 112(A)-112(D) may include computing resources 114(A)-114(D) for executing one or more workload(s) 116(A)-116(D). In some examples, these computer resources 114(A)-114(D) may include data processing resources such as VM instances or hardware computing systems, database clusters, computing clusters, storage clusters, data storage resources, database resources, networking resources, VPNs, and others. Server computers 402 in the data center 400 can also be configured to provide network services and other types of services.

In the example data center 400 shown in FIG. 4, an appropriate LAN 404 (local area network) is also utilized to interconnect the server computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers, between each of the server computers 402A-402F in each data center 400, and, potentially, between the node(s) 112 running on each of the server computers 402. It should be appreciated that the configuration of the data center 400 described with reference to FIG. 4 is merely illustrative and that other implementations can be utilized. In some examples, the data center 400 may also host the predictive network system 106, the controller 108, and the one or more machine-learned models.

In some instances, the data center 400 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources provided by the cloud computing network can include various types of computing resources, such as data processing resources like tenant containers and VM instances, data storage resources, networking resources, data communication resources, network services, VPN instances, and the like.

Each type of computing resource provided by the data center 400 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The data center 400 can also be configured to provide other types of computing resources not mentioned specifically herein.

The computing resources provided by the network 104 may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations.

Figure 5:
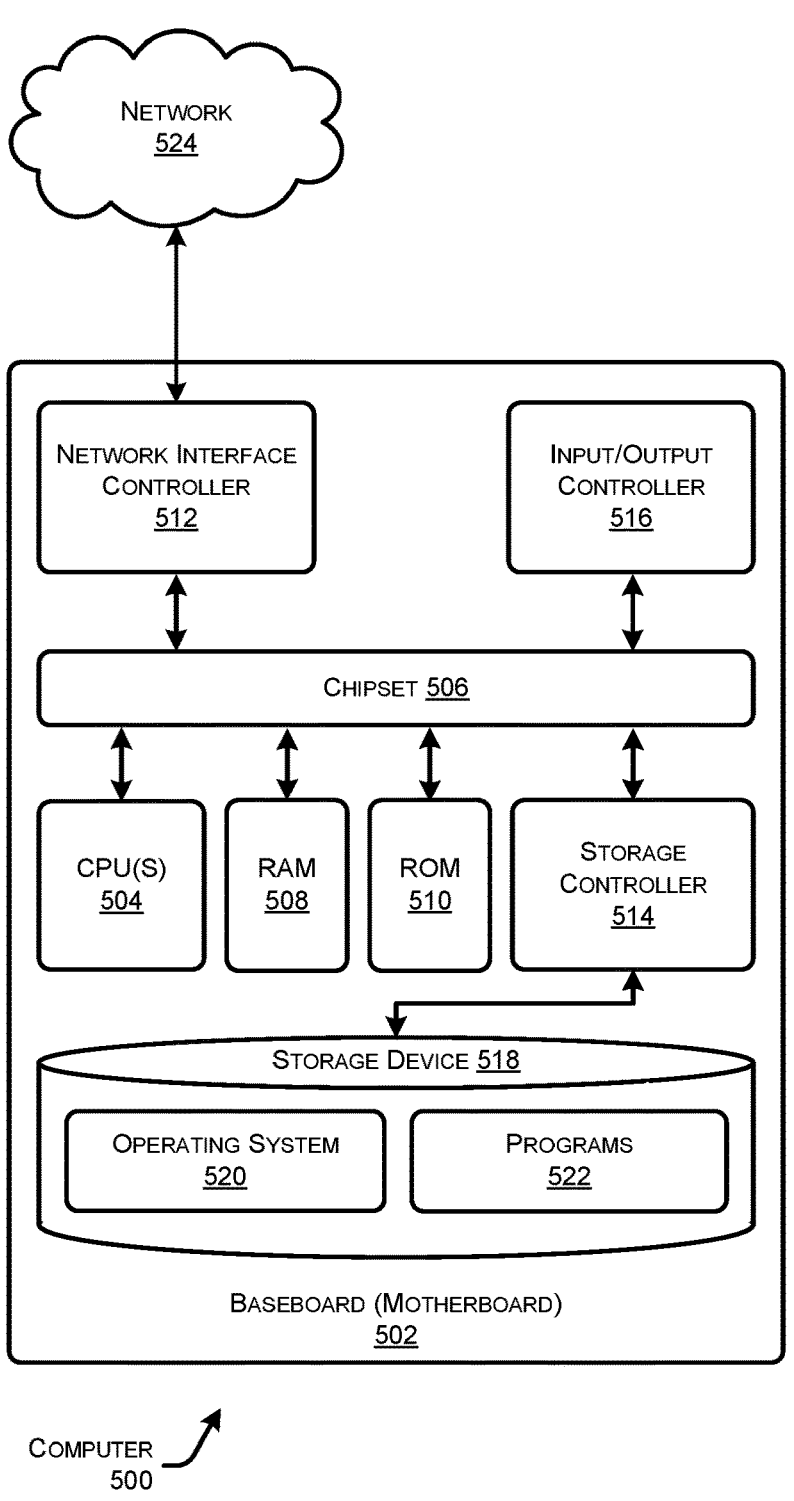
FIG. 5 is a computer architecture diagram showing an illustrative computer hardware architecture for implementing a computing device that can be utilized to implement aspects of the various technologies presented herein.

FIG. 5 is a computer architecture diagram showing an illustrative computer hardware architecture for implementing a computing device that can be utilized to implement aspects of the various technologies presented herein. The computer architecture shown in FIG. 5 may be illustrative of a conventional server computer, network node, router, switch, workstation, desktop computer, laptop, tablet, network appliance, e-reader, smartphone, load balancer, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network. The chipset 506 can include functionality for providing network connectivity through a NIC 512, such as a gigabit Ethernet adapter. The NIC 512 is capable of connecting the computer 500 to other computing devices over the network 524. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the architecture 100 and or any components included therein, may be supported by one or more devices similar to computer 500. Stated otherwise, some or all of the operations performed by the architecture 100, and or any components included therein, may be performed by one or more computer devices 500 operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS®: SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes and functionality described above with regard to FIGS. 1-4, and herein. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors (processors) configured to execute one or more stored instructions. The processor(s) may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for mitigating network failures (e.g., SLA violations, service degradations, network outages, etc.) based on output(s) from a predictive network system. For instance, the programs 522 may be associated with (e.g., utilize, store, access, train, etc.) one or more machine-learning algorithms (e.g., reinforcement learning) for determining various network parameters to be altered prior to a network failure to prevent or otherwise mitigate the network failure.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
determining that a failure is predicted to occur in a network;
determining, at least partially using a machine-learned model, a correlation between the failure and a previous failure that occurred in the network, the machine-learned model being trained based at least in part on previous alterations made to parameters of the network and changes in network performance corresponding to the previous alterations;
determining, based at least in part on the correlation, a condition contributing to the failure;
prior to occurrence of the failure, altering a parameter associated with the network based at least in part on the condition to prevent the failure;
in response to altering the parameter associated with the network, determining a change in network performance; and storing an indication of the change in the network performance and alteration of the parameter.

2. The method of claim 1, wherein the failure causes a service level agreement (SLA) violation with respect to a SLA associated with a client of the network.

3. The method of claim 1, wherein the machine-learned model is trained based at least in part on:
previous conditions contributing to previous failures in the network.

4. The method of claim 1, further comprising:
determining that the condition contributing the failure has ceased; and
based at least in part on the condition ceasing, reverting the parameter to a previous state.

5. The method of claim 1, wherein the condition contributing to the failure is determined further based at least in part on at least one of a topology of the network or an application involved in the failure.

6. The method of claim 1, further comprising receiving an indication from a predictive network system monitoring the network, the indication indicating one or more failures likely to occur in the network.

7. The method of claim 1, wherein the condition is network bandwidth exhaustion and altering the parameter comprises altering at least one of network pathing, tunnel selection, or buffer allocations.

8. The method of claim 1, wherein the condition is CPU exhaustion and altering the parameter comprises at least one of moving a workload or adjusting vCPU allocations.

9. The method of claim 1, wherein the condition is memory exhaustion and altering the parameter comprises at least one of adjusting virtual memory allocations or moving a workload from a first node to a second node.

10. The method of claim 1, wherein the condition is a latency issue and altering the parameter comprises altering a quality of service (QoS) buffer on at least one of an ingress interface or an egress interface.

11. A system associated with a software-defined network (SDN) controller comprising:
one or more processors; and
one or more non-transitory computer-readable media storing instructions that, when executed, cause the one or more processors to perform operations comprising:
determining that a failure is predicted to occur in a network;
determining, at least partially using a machine-learned model, a correlation between the failure and a previous failure that occurred in the network, the machine-learned model being trained based at least in part on previous alterations made to parameters of the network and changes in network performance corresponding to the previous alterations;
determining, based at least in part on the correlation, a condition contributing to the failure;
prior to occurrence of the failure, altering a parameter associated with the network based at least in part on the condition to prevent the failure;
in response to altering the parameter associated with the network, determining a change in network performance; and
storing an indication of the change in the network performance and alteration of the parameter.

12. The system of claim 11, wherein the failure causes a service level agreement (SLA) violation with respect to a SLA associated with a client of the network.

13. The system of claim 11, wherein the machine-learned model is trained based at least in part on:

previous conditions contributing to previous failures in the network.

14. The system of claim 11, the operations further comprising:

determining that the condition contributing the failure has ceased; and based at least in part on the condition ceasing, reverting the parameter to a previous state.

15. The system of claim 11, wherein the condition contributing to the failure is determined further based at least in part on at least one of a topology of the network or an application involved in the failure.

16. The system of claim 11, further comprising receiving an indication from a predictive network system monitoring the network, the indication indicating one or more failures likely to occur in the network.

17. The system of claim 11, wherein:

the condition is network bandwidth exhaustion and altering the parameter comprises altering at least one of network pathing, tunnel selection, or buffer allocations, the condition is CPU exhaustion and altering the parameter comprises at least one of moving a workload or adjusting vCPU allocations, the condition is memory exhaustion and altering the parameter comprises at least one of adjusting virtual memory allocations or moving a workload from a first node to a second node, or the condition is a latency issue and altering the parameter comprises altering a quality of service (QoS) buffer on at least one of an ingress interface or an egress interface.

18. One or more non-transitory computer-readable media storing instructions that, when executed, cause one or more processors to perform operations comprising:

determining that a service level agreement (SLA) violation is predicted to occur in a network;

determining, at least partially using a machine-learned model, a correlation between the SLA violation and a previous SLA violation that occurred in the network, the machine-learned model being trained based at least in part on previous alterations made to parameters of the network and changes in network performance corresponding to the previous alterations;

determining, based at least in part on the correlation, a condition contributing to the SLA violation;

prior to occurrence of the SLA violation, altering a parameter associated with at least one of the network or a resource of the network based at least in part on the condition to prevent the SLA violation;

in response to altering the parameter associated with the at least one of the network or a resource of the network, determining a change in network performance; and storing an indication of the change in the network performance and alteration of the parameter.

19. The one or more non-transitory computer-readable media of claim 18, wherein the machine-learned model is trained based at least in part on:

previous conditions contributing to previous SLA violations in the network.

20. The one or more non-transitory computer-readable media of claim 18, wherein the condition contributing to the SLA violation is determined further based at least in part on at least one of a topology of the network or an application involved in the SLA violation.

* * * * *